United States Patent [19]

Graham, Jr.

[11] Patent Number: 4,483,561
[45] Date of Patent: Nov. 20, 1984

[54] PIPE PULLER

[76] Inventor: Daniel M. Graham, Jr., P.O. Box 211, Pleasantville, Pa. 16341

[21] Appl. No.: 473,685

[22] Filed: Mar. 9, 1983

[51] Int. Cl.³ .............................................. B65G 7/12
[52] U.S. Cl. ......................................... 294/15; 294/92
[58] Field of Search .................... 294/15, 16, 17, 18, 294/19 R, 26, 92

[56] References Cited

U.S. PATENT DOCUMENTS 2,378,454  6/1945  Werling ................................. 294/15
2,599,938  6/1952  Price et al. ........................... 294/15
2,697,000  12/1954  Giffin ................................. 294/92 X

FOREIGN PATENT DOCUMENTS 142953  8/1951  Australia ............................... 294/15
857839  1/1961  United Kingdom ................... 294/15

Primary Examiner—Johnny D. Cherry
Attorney, Agent, or Firm—Charles L. Lovercheck; Wayne L. Lovercheck; Dale R. Lovercheck

[57] ABSTRACT

A pipe puller for pulling pipe from a stack of pipes is disclosed. The puller has an elongated handle and two spaced parallel legs extending from the handle. One leg is longer than the other. A stop plate is attached to the distal end of the longer leg so that when the shorter leg is inserted into the end of a flanged pipe, the stop plate engages and is disposed behind the flange on the pipe so that the pipe puller forms a convenient handle by which the pipe can be pulled from the stack of pipes.

1 Claim, 5 Drawing Figures

PIPE PULLER

BACKGROUND OF THE INVENTION

A problem has long existed in removing heavy iron pipe from a stack of pipe. It is difficult for the worker to grip a pipe to pull it from a stack of pipe as each pipe in the stack rests on the pipe adjacent it. The puller disclosed herein provides workmen with a grip for their hands to pull pipe from a stack in the usual way. The pipes are heavy and friction resists pulling the pipe from the stack. Therefore, a great deal of energy is required to pull a large pipe from a stack. The puller disclosed provides mans to transmit such energy.

Applicant has provided a handle with bifurcated legs extending from one end of the handle so that one leg can enter the end of the pipe and the other overlie the pipe with a stop plate on it to engage a flange or other suitable stop means on the pipe. Thus, the effort and convenience of removing pipes from a stack is greatly increased.

REFERENCE TO PRIOR ART

Applicant is aware of the following prior art patents but none of these patents disclose a convenient tool for pulling pipe from a stack.

U.S. Pat. No. 1,334,510
U.S. Pat. No. 1,401,046
U.S. Pat. No. 1,563,575
U.S. Pat. No. 1,854,379
U.S. Pat. No. 1,973,568
U.S. Pat. No. 2,654,116
U.S. Pat. No. 2,999,310
U.S. Pat. No. 2,254,912
U.S. Pat. No. 3,282,619
U.S. Pat. No. 3,520,570.

OBJECTS OF THE INVENTION

It is an object of the invention to provide an improved pipe puller.

Another object of the invention is to provide a pipe puller that is simple in construction, economical to manufacture, and simple and efficient to use.

Another object of the invention is to provide a pipe puller with a handle having two spaced parallel legs on one end with a stop means on one leg to engage a flange on the pipe for pulling it from a stack.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction within departing from the spirit or sacrificing any of the advantages of the invention.

GENERAL DESCRIPTION OF THE DRAWINGS

FIG. 5 is an end view of a stack of pipes such as the pipe puller would be used to pull a pipe from.

DETAILED DESCRIPTION OF THE DRAWINGS

Figure 1:
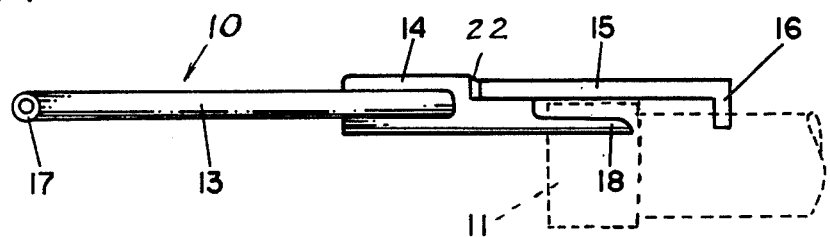
FIG. 1 is a side view of a pipe puller according to the invention.
Figure 2:
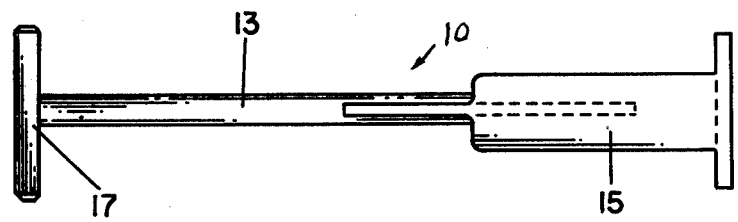
FIG. 2 is a top view of the pipe puller shown in FIG. 1.
Figure 3:
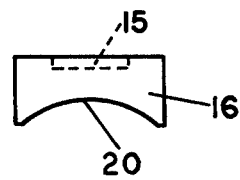
FIG. 3 is an end view of the pipe puller taken from the right hand end.
Figure 4:
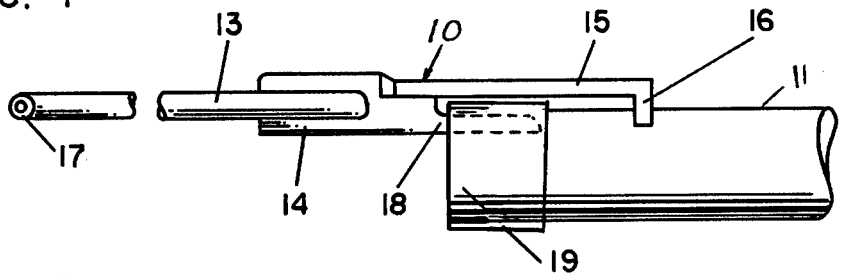
FIG. 4 is a side view of the pipe puller shown connected to a pipe.
Figure 5:
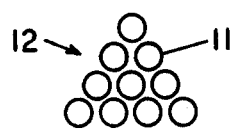

Now, with more particular reference to the drawings, the pipe puller is indicated generally at 10. It is useful for pulling pipes 11 out of a stack of pipe 12. The pipe puller has a handle 13 which may be made of a conventional pipe one inch or one and one-quarter inch in diameter, for example. The handle has a frame plate 14 welded to it. The frame is made from three plates which are frame plate 14, leg plate 15 and stop plate 16. The plate 14 may be received in a longitudinal slot in handle 13. The leg plate 15 overlies the frame plate 14 and an insert leg 18 is integral with it. The bottom insert leg 18 can be inserted in the open end of a pipe 11. The plate 15 extends from a recess 22 in the plate 14 and rests on the top edge and is spaced from the insert leg 18 which may be disposed at an angle of ninety degrees to the leg 18. The plate 15 has a stop plate 16 welded to its distal end. The leg 18 is the shorter leg and the longer leg is formed by the plate 15 so that when the leg 18 is inserted into the open end of a pipe the longer plate 15 overlies the flange 19 and the stop 16 may be dropped down behind the flange so that the contoured edge 20 of plate 16 rests on the top of the pipe 11 and generally conforms to the exterior contour. Therefore, the operator can grasp the T-handle 17 with both hands and exert a strong force on the pipe to pull the pipe out of the pile. The handle 17 forms a positive convenient hand hold for the workman.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A pulling tool (10) for pulling pipe from a stack of pipes having a first end and a second end, and
   comprising an elongated tubular handle (13) having a longitudinally extending slot extending from said first end toward said second end,
   a first plate like frame member (14) having one end received in said longitudinally extending slot and welded to said tubular handle and terminating in an insert leg,
   a second plate like frame member (15) having a first end and a second end,
   said first end of said second plate like frame member being fixed to said first plate like frame member (14) and disposed generally perpendicular to said first mentioned plate like frame member (14),
   said insert leg having a reduced size end (18) disposed in parallel spaced relation to said second mentioned plate like frame member (15),
   said reduced size end (18) being adapted to be inserted into the open end of a pipe,
   said second plate like frame member (15) being adapted to overlie a pipe when said reduced size end is inserted in said pipe,
   a stop plate (16) on the second plate like frame member (15) and disposed generally perpendicularly to said first plate like frame member and to said second plate like frame member,
   said stop plate having a contoured edge (20) spaced from said second plate like frame member (15) and adapted to engage a flange on the pipe whereby an operator can pull the pipe from a stack,
   said handle (13) has a T-shaped hand engaging member (17) attached thereto remote from said plate like frame members (14 and 15).

* * * * *